Figure 1:
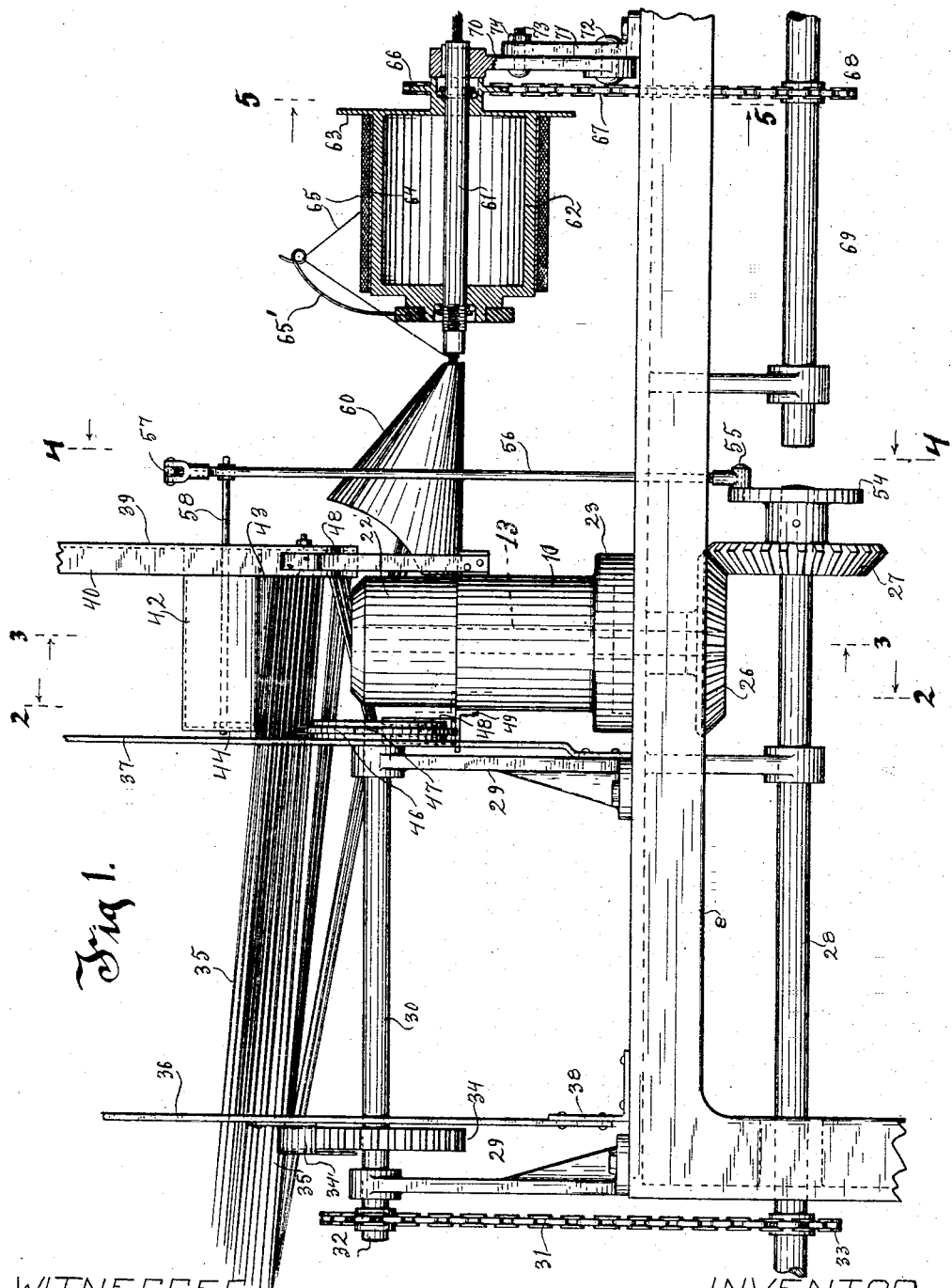

B. McNEIR.
GRASS TWINE MACHINE.
APPLICATION FILED SEPT. 21, 1914.

1,186,215.

Patented June 6, 1916.
4 SHEETS—SHEET 1.

WITNESSES
C. F. Miller.
Emily Schwalter.

INVENTOR
Burrous McNeir.
By Morsell, Keeney & French.
ATTORNEYS.

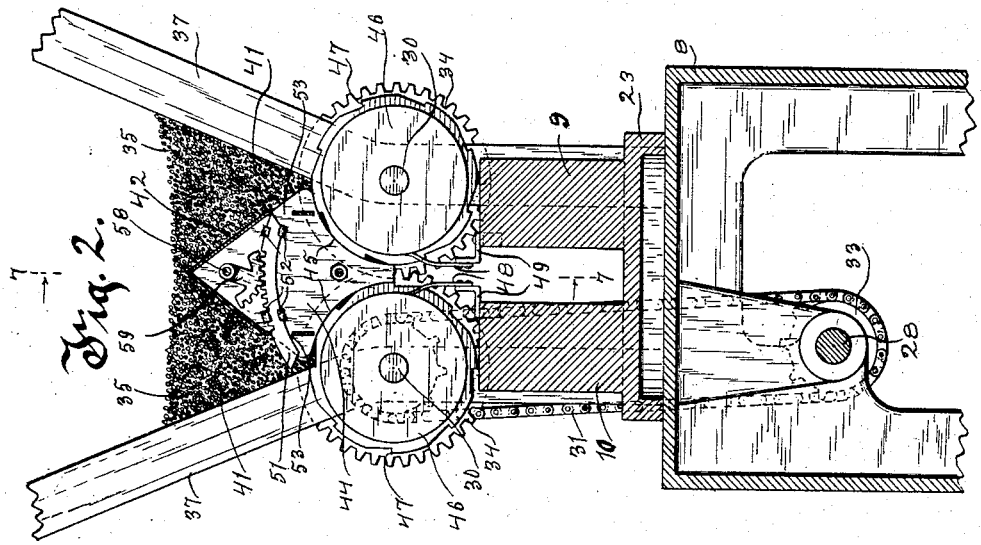

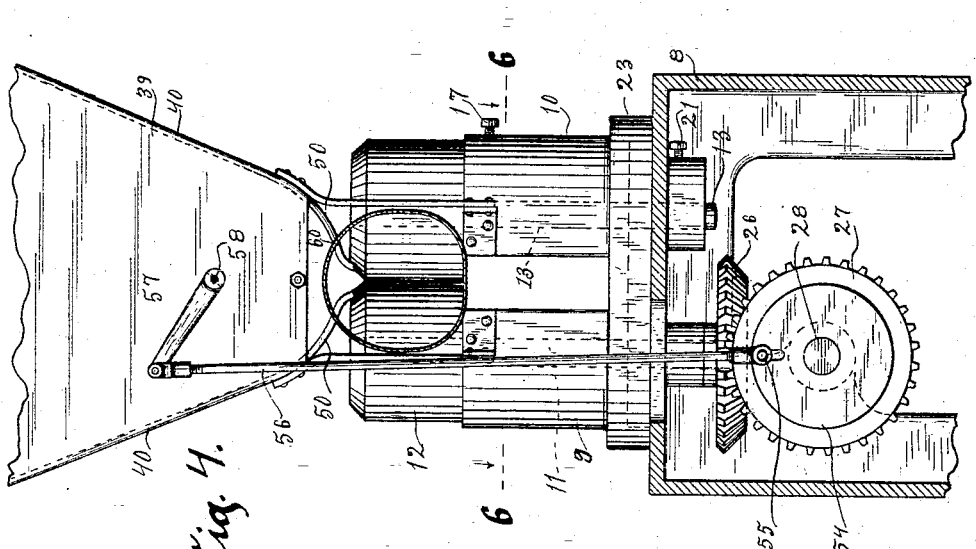

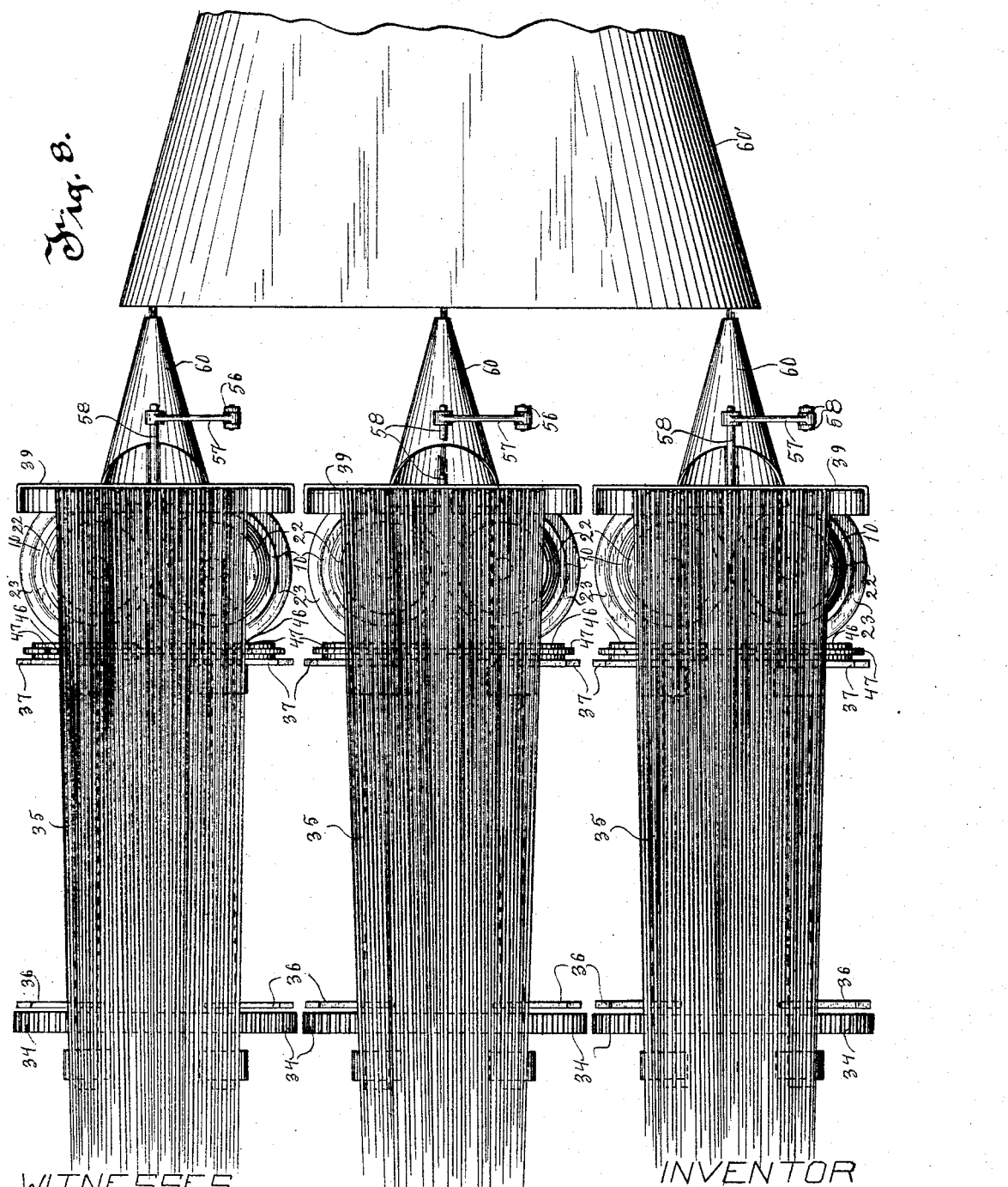

UNITED STATES PATENT OFFICE.

BURROWS McNEIR, OF GREEN BAY, WISCONSIN.

GRASS-TWINE MACHINE.

1,186,215.

Specification of Letters Patent.

Patented June 6, 1916.

Application filed September 21, 1914. Serial No. 862,745.

*To all whom it may concern:*

Be it known that I, BURROWS MCNEIR, a citizen of the United States, and resident of Green Bay, in the county of Green Bay, Wisconsin, have invented new and useful Improvements in Grass-Twine Machines, of which the following is a description, reference being had to the accompanying drawings, which are a part of this specification.

My invention has relation to improvements in grass twine machines; that is to say, to a class of machines adapted for feeding longitudinally therethrough lengths or blades of grass (usually a grass of the sedge family), the mechanism causing the grass lengths to travel through the machine in overlapped relation, and the mechanism also causing the overlapped lengths or blades of grass to be wrapped with a spirally trending thread. The twine so formed is subsequently, by means of a loom, woven into a so-called grass carpet or rug.

One of the primary objects of the present invention is, to provide a pair of notched wheels or disks at the contracted mouth or outlet of the grass holder, the notches of said wheels being alternately positioned. By thus providing a pair of these wheels, they can be run at a very slow rate of speed, as, owing to the notches being alternately disposed with respect to each other, a practically continuous feeding is accomplished. Furthermore, by providing a pair of notched wheels feeding into a funnel, or pair of advancing rolls, or other advancing mechanism, the liability of breakage of the grass lengths is lessened. Also, a more uniform feed of the material is secured, inasmuch as if a notch of one of the wheels should fail to take its proper charge or load of grass blades, the notch of the adjacent wheel will nevertheless receive its charge, so that the slight break in the feed would be almost unappreciable, whereas, if only one notched wheel were provided, and one of the notches of this wheel should miss its charge, it would result in quite a difference in the evenness of the feed.

Another important object is, that the mechanism is such as to provide for the grass blades being fed from the grass holder to and between advancing rolls, at an angle. By this arrangement, the grass blades have an opportunity to work downwardly between the rolls while they are being advanced forwardly by said rolls, thereby making room for the next succeeding bunch or charge of grass. If the grass lengths were fed straight between the rolls, the said grass blades would remain in that position and thus check or clog the rolls against the entrance of succeeding bunches of grass.

It frequently happens, especially with sedge grass cut from the marsh lands, that some of the grass will run dark, while the grass cut from other portions of the field will be of a lighter hue. In running this grass of varying hues through the machine, if no attempt is made to guard against it, the finished product or grass twine will come out of the machine either of dark color or light color, as the case may be, and when these differently colored twine sections are passed through the loom, the finished grass mat or rug will be more or less unsightly, owing to dark and light streaks appearing therein. It is, therefore, a further object of my invention to provide a means whereby grass lengths of dark hue may be separated from those of the light hue, and fed alternately, so that there is an even mixture of the dark and light colors, whereby the objectionable streaky appearance is avoided and the beauty of the finished mat thereby enhanced.

A still further incidental object of the invention is, the provision of a means whereby the spool containing the thread, after the thread is unwound therefrom, can be readily removed, and a new spool substituted.

With the above and other objects in view, the invention consists of the devices and parts, or the equivalents thereof, as hereinafter more fully set forth.

In the accompanying drawings, Figure 1 is a side elevation of a grass twine machine equipped with my improvements, the thread-carrying mechanism being shown in longitudinal section, and the drive shaft and other parts being shown as broken away; Fig. 2 is a cross section on the line 2—2 of Fig. 1, looking in the direction of the arrow, the upper portions of the grass holder arms being shown broken away; Fig. 3 is a cross section on the line 3—3 of Fig. 1, looking in the direction of the arrow, the upper portion of the abutting board shown as broken away; Fig. 4 is a similar view of Fig. 3 on the line 4—4 of Fig. 1, looking in the direction of the arrow; Fig. 5 is a cross section on the line 5—5 of Fig. 1, looking in the direction of the arrow; Fig. 6 is a horizontal section on the line 6—6 of Fig. 4; Fig. 7 is a section on the line 7—7 of Fig. 2; and Fig. 8 is a fragmentary plan view showing a modified form of construction.

Referring to the drawings, the numeral 8 is employed to denote or indicate the general frame work upon which the operating parts of the machine are supported. Extending upwardly from the top of the frame work are tubular posts or standards 9 and 10 respectively. The bore of standard 9 is just of sufficient diameter to admit of the passage freely therethrough of a vertical shaft 11. This shaft extends above the standard and carries a roller 12. The bore of standard 10 is considerably greater in diameter than the diameter of the bore of standard 9, and passing through this enlarged bore is another vertical shaft 13. This shaft, at the upper end of the bore, passes through a box 14. A coiled spring 15 bears at its inner end against this box, and a plate 16 bears against the outer end of this spring. An adjusting screw 17 is threaded through the side of the post or standard 10, and at its inner end impinges against the plate. It is obvious that by turning the screw in one direction or the other, the degree of pressure of the spring against the box 14, can be readily regulated. A similar arrangement is provided for the lower end of the shaft 13; that is to say, that portion of the said shaft which extends downwardly beneath the top of the frame work, passes through a similar box 18, and a corresponding coiled spring 19, plate 20, and adjusting screw 21, are provided. The upper end of shaft 13, which extends above the tubular post or standard 10, carries a roller 22 similar to the roller 12, and adjacent thereto.

The lower ends of the tubular posts or standards 9 and 10 are connected by a recessed, enlarged base 23. Disposed in this recess, and mounted fast upon the two shafts 11 and 13 respectively, are intermeshing gear wheels 24 and 25, whereby the rotation of one shaft is imparted to the other. Also, rotation of one of these shafts,—for instance, the shaft 11,—is secured through the medium of a beveled pinion 26 mounted on the lower end of said shaft, and which beveled pinion is in meshing engagement with a beveled gear 27 carried at the end of a horizontally disposed drive shaft 28. The drive shaft is driven by any suitable source of power.

Above the top of the table and mounted in pairs of upright bearing posts 29—29 are horizontal shafts 30—30. Rotation is imparted to one of these shafts by means of a sprocket chain 31 which passes around a sprocket wheel 32 fast on said shaft, and also around a sprocket wheel 33 fast on the main drive shaft 28, and the rotation of this particular shaft 30 is imparted to the other companion shaft by means of intermeshing gears 34—34 mounted fast on said shafts 30. A guard or housing 34' is provided for the upper portion of the gears 34.

The blades of grass are shown in Figs. 1 and 2, and are indicated by the numeral 35. A suitable holder is required for these blades or lengths of grass, and for this purpose I provide two sets of upwardly diverging flat arms. The outermost pair or set of arms I have indicated by the numerals 36, and the innermost pair or set of arms by the numerals 37. These arms may be supported or secured in any suitable manner, and in the drawings I have shown the outermost arms secured at their lower ends to angle brackets 38, and the inner arms to the innermost upright bearing posts 29.

Spaced a desired distance longitudinally from the inner arms 37 is an abutting board 39 against which the butt ends of the lengths or blades of grass are placed and thereby evened. This abutting board is provided with edge flanges 40—40 extending at angles therefrom and forming guards to prevent undue separation of the butt ends of the grass. The downward converging of the arms 36 and 37, as will be seen, forms a gradually narrowing or contracting passage.

Disposed in the space between the inner holder arms 37 and the abutting board 39, is a partition which divides the lower portion of said space into two gradually contracting or narrowing spaces 41—41 terminating in attenuated throats or discharge openings. This partition may be of any desirable form, but I prefer to employ the specific form shown in the accompanying drawings, consisting of a walled structure comprising a peaked or slanting roof 42, and straight side pieces 43—43. The slanting roof portion, in conjunction with the inner arms 37 of the grass holder, makes the greater portions of each of the passages 41, of V-shaped or downwardly converging form.

In cases where some of the grass blades are dark and other bunches or quantities light, they are separated, and the dark lengths are placed in one of the V-shaped passages 41, and the light blades in the other V-shaped passage 41. The right-hand end of the dividing partition extends to and against the abutting board 39. The left-hand end of the partition is provided with an end piece 44. The power portion of this end piece is extended downwardly, and the opposite edges of the downwardly extending portion, are curved inwardly, as indicated by the numerals 45—45, the respective inward curves lying close to and conforming to the peripheries of disks or wheels 46—46 mounted on the shafts 30—30. The centers of the peripheries of these disks are formed or provided with annular rings which are equipped with notches 47, the notches of the two rings being alternately disposed or positioned. The curved edges 45, on account of their lying close to the peripheries of the disks 46, act as retaining walls for holding the blades of grass in the notches 47.

It is desirable to provide positive means for forcing the bunches of grass from the different notches of the disks, after said disks have rotated for a certain distance. To provide for this, I employ two spring arms 48—48, (see particularly Figs. 2 and 7), which are secured at their lower ends to angle brackets 49—49, connected to the posts or standards 9 and 10. The upper ends of these spring arms are bifurcated (see Fig. 7), and the two fingers of each arm, formed by the bifurcation, straddle the annular, notched portion of the disk and rest upon the main periphery of said disk. It is obvious, that when a notch of a disk reaches the spring finger relating to that particular disk, the said finger sweeps or forces the bunch of grass out of and free from engagement with the notch.

It will be noted particularly from Fig. 4 of the drawings, that the lower end of the abutting board 39 is provided with downwardly converging fingers 50—50, which assist the narrowed or contracted mouths or outlets of the passages 41—41 in directing the blades into the biting action of the rolls 12 and 22, the upper ends of said rolls being preferably beveled, as clearly shown, in order to facilitate the entrance of the grass blades therebetween.

It is desirable, if not necessary, that the grass lengths in the two passages 41 be positively acted upon, so as to force the lengths downwardly into the narrowing outlet openings, and into engagement with the notches of the disks 46. Any desirable and suitable mechanism may be employed for this purpose, but I prefer to employ the specific form of mechanism shown in the drawings, and most clearly illustrated in Fig. 2, and consisting of a rocking segment 51 movable in guides 52—52 secured to the end wall 44 of the dividing partition. The opposite ends of this rocking segment are beveled, as clearly shown. Therefore, when the segment is swung toward and into the left hand space 41, the beveled end will act upon a number of blades of grass, and force said blades downwardly through the attenuated mouth or outlet, and into position to be engaged by one of the notches 47. On the opposite reciprocation of the rocking segment, its opposite end will act upon some of the blades of grass in the right-hand space 41, and force a number of these blades downwardly into the attenuated mouth on that side of the grass holder, and into position to be engaged by the notch of the right-hand disk 46.

In order not to interfere with the reciprocation of the segment 51, the straight end walls 43 of the dividing partition, are provided with openings 53. As a convenient means of rocking this segmental arm, I mount rigidly on the drive shaft 28 a disk 54 having a wrist pin 55 extending from one face thereof. To this wrist pin is connected the lower end of a pitman 56, and the upper end of this pitman articulates with a rod 57, the said rod extending to and being connected with a rocking arm 58, which rocking arm extends through the dividing partition and through the end piece 44 of said partition, and carries on this end a segmental rack 59, the teeth of which are adapted to engage the teeth on the upper edge of the rocking segment 51. It is obvious that, as the main shaft 28 is rotated, its rotation is imparted to the disk 54, and a reciprocating motion is conveyed to the pitman 56, and through the connecting rod 57 the shaft 58 is given a rocking motion, which rocking motion is, of course, imparted to the rack bar 59, which latter, in turn, causes a back and forth reciprocation of the segmental packer or forcing arm 51.

In grass twine machines, after the grass is advanced by the first set of feed rolls, it is customary that the lengths of grass be brought together and converged into compact form ready for the wrapping thread. I, therefore, show, to the rear of the rolls 12 and 22, a trumpet or condensing funnel 60.

Suitable mechanism should be provided for wrapping a thread or cord around the lengths of the material, as said lengths are fed from the condensing trumpet or other condensing means. Referring to this mechanism, the numeral 61 indicates a fixed, tubular shaft through which the condensed lengths of grass are drawn. Rotatably mounted on this fixed shaft is a drum 62, said drum provided at one end with a head 63. Surrounding the drum and removable longitudinally therefrom is a spool 64, upon which the thread 65 is wound. The usual spring tension arm 65' is also provided, said arm being equipped at its end with an eye through which the thread from the spool passes, the said cord being carried down to the compressed lengths and wrapped around said compressed lengths in the space between the nose of the funnel and the end of the tubular shaft 61.

It is, of course, necessary that the drum 62 be rotated, so as to unwind the thread from the spool 64. To accomplish this rotation the rear end of the drum is provided with a projecting hub upon which is formed a sprocket wheel 66. Around the sprocket wheel passes a sprocket chain 67, which chain extends to and passes around the sprocket wheel 68 mounted on a shaft 69 which is shown as in longitudinal alinement with the main drive shaft 28, and which shaft 69 may be driven in any desirable manner.

It is necessary, when all the thread on one spool is used up or becomes exhausted, to remove the empty spool and replace it with a new spool. To provide for this, I provide the bearing for one of the ends of the shaft 61 in the upper end of an arm 70. The lower end of this arm is pivoted to an upright 71, on pivot bolt 72. When the bearing arm 70 is in its normal upright position, with the shaft 61 in longitudinal alinement with the mouth of the funnel 60, said arm is held locked to the upright 71 by means of a bolt and nut 73 and 74 respectively. Whenever it is desired to remove the spool, all that is necessary is, to turn off the nut 74 and remove the bolt 73, when, of course, the arm 70 can be swung to the dotted line position shown in Fig. 5, in which position, of course, the spool can be readily removed.

In the use of the machine, the grass is placed in the holder, as shown most clearly in Figs. 1 and 2, and where the grass runs in dark and light hues, care should be taken to separate the dark lengths from the light, and place the dark blades in one of the passages 41, and the light blades in the other passage 41, so that there may be an even admixture of the varying hues, as hereinbefore fully pointed out. The main operating shafts 28 and 69 are set in motion. The rotation of shaft 28 is communicated to the different movable parts of the feeding mechanism, as hereinbefore fully pointed out, and the rotation of shaft 69 causes the rotation of the drum 62.

Considering the action of the various mechanisms *seriatim*, the rocking segment 53 will cause a downward forcing of the grass blades first in one passage or division 41, and then in the next passage or division 41, and so on alternately. As the disks 46 are rotated toward each other, and as the notches 47 of these disks are alternately set or positioned, first one notch of one disk will engage a quantity or bunch of the grass in the contracted mouth of the discharge opening of one of the passages 41, and then a notch of the other disk will engage a quantity or bunch of the grass in the contracted mouth of the discharge opening of the other passage 41, and so on alternately. Each notch carries its bunch of grass downwardly between the rolls 12 and 22 for a slight distance, causing said bunch to be bent at an angle, as clearly shown in Fig. 1, thus giving the grass blades an opportunity to work downwardly while they are being advanced forwardly by the rolls, and whereby room is made for the next succeeding bunch of grass carried by the notch of the other disk. The grass thus alternately advanced between the rolls is next forced into the condensing trumpet or funnel 60, and is wrapped with a thread as it emerges from the outlet of said funnel, and this wrapped grass is drawn through the tubular shaft 61 by the usual draw rolls (not shown) located at the end of the machine.

From the foregoing description of the invention it will be seen that, by the provision of the notched wheels, the notches of one wheel being alternately positioned with respect to the notches of the other wheel, not only can the notched disks be run at a slow rate of speed, but practically a continuous feed is provided, and also a very uniform feed of the material is secured. Furthermore, the angularity of the feed of the grass to the feed rolls, secures an important advantage, as it enables a bunch of the grass blades to work downwardly while they are being advanced forwardly, thereby making room for the next succeeding bunch of grass. A still further very important provision of the invention is, the arrangement of the holder, in conjunction with the dividing partition, whereby different hues or colors of the grass can be separated and fed alternately to the feed rolls, insuring an even admixture thereof, and preventing streaks in the finished rug or carpet.

While the machine is particularly adapted for feeding lengths of grass, yet I do not wish to restrict myself specifically to this use of the mechanism, inasmuch as it is adaptable for feeding lengths of any flexible material that it is desired to be formed into twine.

Fig. 8 of the drawing shows a modified construction and arrangement, whereby a number of machines of the kind described may be arranged side by side, each discharging into its respective funnel 60, and the material from each funnel then being discharged into a common funnel 60'. This construction results in a further admixture of different hues or colors, whereby the color of each of the grasses issuing from the different machines, is blended into a uniform color.

What I claim is:

1. In a machine of the character described, a pair of rotatable feed rolls, and a pair of feed disks mounted in close relation to each other with their axes arranged at an angle to the axes of said feed rolls, each of said feed disks having its periphery notched to receive bunches of material and adapted to rotate continuously in one direction and in an opposite direction to the other disk, the notches of the disks being alternately disposed in respect to each other.

2. In a machine of the character described, the combination of opposed, rotatable feed rolls, opposed, rotatable, peripherally-notched feed disks at angles to the feed rolls, and so positioned with reference to the feed rolls as to cause the notches of each disk to feed bunches of material between the feed rolls, the notches of the disks being alternately disposed with respect to each other.

3. In a machine of the character described, a pair of rotatable feed rolls, a pair of feed disks mounted in close relation to each other with their axes arranged at an angle to the axes of said feed rolls, each of said disks having its periphery notched to receive bunches of material and adapted to rotate continuously in one direction and in an opposite direction to the other disk, and means for alternately releasing the bunches of material from the notches.

4. In a machine of the character described, the combination of opposed, coöperating rotatable feed rolls, opposed coöperating rotatable peripherally notched feed disks positioned with their axes at an angle to the feed rolls to cause the notches of each disk to feed bunches of material between the feed rolls, and means for alternately releasing the bunches of material from the notches.

5. In a machine of the character described, the combination of a vertical stationary holder for the material, said holder being sub-divided into a plurality of downwardly-converging passages, feeding mechanism in proximity to the contracted outlet ends of the converging passages and adapted to feed alternately from said converging passages, and means located within and acting upon the material in the passages, for forcing said material downwardly into the contracted outlets of said passages.

6. In a machine of the character described, the combination of a feeding mechanism, a holder for the material, said holder being subdivided into a plurality of downwardly-converging passages, said passages having their contracted outlet openings leading to the feeding mechanism, and a reciprocating device adapted to act alternately on the material within the passages, to force said material downwardly into the contracted outlets of said passages.

7. In a machine of the character described, the combination of feeding mechanism, a holder for the material, said holder being subdivided into a plurality of downwardly-converging passages, said passages having their contracted outlet openings leading to the feeding mechanism, a segmental bar provided with oppositely-beveled ends, and means for reciprocating said bar so as to alternately project the opposite ends thereof into the respective passages.

8. In a machine of the character described, the combination of feeding mechanism, a holder for the material, said holder being subdivided into a plurality of downwardly-converging passages having their contracted outlet openings leading to the feeding mechanism, a segmental bar provided with oppositely-beveled ends, said bar having teeth on one of its longitudinal edges, a pivoted, toothed, segmental rack engaging the teeth of the segmental bar, and means for imparting an alternately rocking movement to said segmental rack, to force said material downwardly into the contracted outlets of said passages.

9. In a machine of the character described, the combination of a holder for the material, said holder being subdivided into a plurality of downwardly converging passages having contracted outlet openings, opposed coöperating notched, rotatable feed disks arranged below the contracted outlet openings to feed alternately from said contracted opening, and coöperating feed rolls having their axes at angles to the axes of the notched disks, and to which feed rolls the notched disks are adapted to feed the material.

10. In a machine of the character described, the combination of a holder for the material, said holder being subdivided into a plurality of downwardly-converging passages having contracted outlet openings, notched, rotatable feed disks arranged below the contracted outlet openings, the notches of the disks being alternately disposed, and feed rolls having their axes at angles to the axes of the notched disks, and to which feed rolls the notched disks are adapted to feed the material.

11. In a machine of the character described, the combination of a holder for the material, said holder being subdivided into a plurality of downwardly-converging passages having contracted outlet openings, opposed coöperating notched feed disks arranged below the contracted outlet openings to feed alternately from said contracted openings, coöperating feed rolls having their axes at angles to the axes of the notched disks, and to which feed rolls the notched disks are adapted to feed the material, and means for releasing the lengths of material from the notches, after the ends of the material have been carried downwardly at an angle from the holder and into the bite of the feed rolls.

12. In a machine of the character described, the combination of a single feeding mechanism, a holder for the material, said holder being sub-divided into a plurality of downwardly-extending passages leading to the feeding mechanism, said passages adapted for the introduction therein of different hues or colors of the material to be operated upon, and a single means which alternately acts upon the material in the different compartments, and alternately forces said material from said compartments to the single feeding mechanism.

13. In a machine of the character described, the combination of opposed, rotatable feed rolls, opposed, peripherally-notched feed disks set at angles to the feed rolls, and so positioned with reference to the feed rolls as to cause the notches of each disk to feed bunches of material between the rolls, and a member extending between the peripheries of the disks for a certain distance, the opposite edges of said member being curved to conform to the peripheries of said disks, and adapted to retain the lengths of material in the notches for a certain distance of travel of the disks.

14. In a machine of the character described, the combination of opposed, rotatable feed rolls, opposed, peripherally-notched feed disks set at angles to the feed rolls, and so positioned with reference to said rolls, as to cause the notches of each disk to feed bunches of the material between the rolls, a member extending between the peripheries of the disks for a certain distance, the opposite edges of said member being curved to conform to the peripheries of said disks, and adapted to retain the lengths of material in the notches for a certain distance of travel of the disks, and means for releasing the bunches of material from the notches after the disks have rotated beyond the curved confining edges.

15. In a machine of the character described, the combination of opposed, rotatable feed rolls, opposed, rotatable, peripherally-notched feed disks adjacent to the rolls, and at angles thereto, a holder for the material, and a partition dividing the holder above the feeding mechanism into a plurality of compartments, said partition formed with a slanting or peaked upper portion, and having an extended end piece, the extended portion of said end piece provided with oppositely-curved edges lying, respectively, adjacent to the notched disks for a certain distance, and conforming to the peripheries of said disks, spaces or passages being left between the curved edges and the disks respectively adjacent thereto, and with which spaces or passages the compartments are respectively in communication.

16. In a machine of the character described, the combination of a rotatable member adapted for carrying removably thereon a spool of thread, a vertical arm forming a bearing at its upper end for one end of said member, a standard to which the bearing arm is pivoted at its lower end, and means for normally locking the bearing arm in an upright position to the standard, said locking means when released, adapting the pivoted arm to be swung downwardly and outwardly to a position to permit of the removal of the spool of thread.

17. In a machine of the character described, the combination of a pair of opposed coöperating rotatable peripherally notched feed disks, of separate passages leading respectively to the space between said feed disks, and means for forcing the material alternately from the respective passages to the space between the disks.

18. In a machine of the character described, the combination of a pair of opposed coöperating rotatable peripherally notched feed disks, of separate passages leading respectively to the space between said disks, means for forcing material alternately from the respective passages to the space between the disks, and feeding mechanism to which the material is forced from between the disks.

19. In a machine of the character described, a plurality of feeding devices each embodying a holder for containing different colored grasses separate from each other, a pair of feed disks having alternately disposed peripheral notches, and a condensing means for receiving and mixing the different colored grasses from said feed disks, and a funnel for receiving the mixed grasses from all of said condensing means.

In testimony whereof, I affix my signature, in presence of two witnesses.

BURROWS McNEIR.

Witnesses:
H. KRUEGER,
AGNES MARCHANT.

Copies of this patent may be obtained for five cents each, by addressing the "Commissioner of Patents, Washington, D. C."